United States Patent [19]

Nobileau

[11] Patent Number: 5,645,110
[45] Date of Patent: Jul. 8, 1997

[54] FLEXIBLE HIGH PRESSURE PIPE

[76] Inventor: Philippe Nobileau, 410 Avenue des Roches Rouges, 83530 Agay, France

[21] Appl. No.: 347,878

[22] Filed: Dec. 1, 1994

[51] Int. Cl.$^6$ .................................................. F16L 11/16
[52] U.S. Cl. .................... 138/134; 138/135; 138/127; 138/122
[58] Field of Search .................. 138/135, 137, 138/138, 140, 129, 130, 134, 122, 177, 178, 109

[56] References Cited

U.S. PATENT DOCUMENTS

| | | |
|---|---|---|
| 496,571 | 5/1893 | Lapsolu . |
| 691,259 | 5/1902 | Hardy . |
| 753,230 | 3/1904 | Calcutt . |
| 841,888 | 1/1907 | Packham et al. . |
| 1,095,648 | 5/1914 | Lutz . |
| 1,145,434 | 7/1915 | Pechstein . |
| 2,019,890 | 11/1935 | Burke . |
| 2,087,373 | 7/1937 | Dodge . |
| 2,266,227 | 12/1941 | Mall . |
| 2,402,497 | 6/1946 | Johnson ................... 138/122 |
| 2,798,508 | 7/1957 | Kahn . |
| 2,814,313 | 11/1957 | Tate ............................ 138/76 |
| 3,137,319 | 6/1964 | St. John et al. . |
| 3,140,968 | 7/1964 | Barrios et al. . |
| 3,234,970 | 2/1966 | Baker et al. . |
| 3,420,721 | 1/1969 | Bayless et al. . |
| 3,498,862 | 3/1970 | Comastri et al. . |
| 3,515,610 | 6/1970 | Comastri et al. . |
| 3,530,567 | 9/1970 | Secord . |
| 3,548,882 | 12/1970 | Rinker ..................... 138/129 |
| 3,604,461 | 9/1971 | Matthews .................. 138/137 |
| 3,687,169 | 8/1972 | Reynard . |
| 3,698,651 | 10/1972 | Miller . |
| 3,823,045 | 7/1974 | Hielema . |
| 4,013,100 | 3/1977 | Thiery et al. ............. 138/129 |
| 4,062,380 | 12/1977 | Hofle . |
| 4,098,298 | 7/1978 | Vohrer . |
| 4,172,474 | 10/1979 | Stahl . |
| 4,213,485 | 7/1980 | Ottewell et al. . |
| 4,233,097 | 11/1980 | Stahl . |
| 4,256,146 | 3/1981 | Genini et al. ............. 138/139 X |
| 4,332,509 | 6/1982 | Reynard et al. . |
| 4,344,462 | 8/1982 | Aubert et al. ............. 138/130 |
| 4,377,186 | 3/1983 | Genini et al. . |
| 4,403,631 | 9/1983 | Abdullaev et al. . |
| 4,549,581 | 10/1985 | Unno et al. . |
| 4,620,569 | 11/1986 | Von Glanstätten et al. ....... 138/132 |
| 4,688,604 | 8/1987 | Griffiths .................. 138/129 |
| 4,706,713 | 11/1987 | Sadamitsu et al. ........ 138/137 |
| 4,727,909 | 3/1988 | Griffiths . |
| 4,800,928 | 1/1989 | Kanao ..................... 138/122 |
| 4,811,761 | 3/1989 | Huvey ..................... 138/122 |
| 4,852,924 | 8/1989 | Kanao ..................... 138/144 |
| 4,867,205 | 9/1989 | Bournzal et al. .......... 138/130 |
| 4,903,735 | 2/1990 | Delacour et al. .......... 138/133 |
| 5,024,252 | 6/1991 | Ochsner ................... 138/130 |
| 5,063,969 | 11/1991 | Snyder ................... 138/154 |
| 5,117,874 | 6/1992 | Ochiai et al. ............ 138/140 |
| 5,176,179 | 1/1993 | Bournzal et al. .......... 138/130 |
| 5,261,462 | 11/1993 | Wolfe et al. ............. 138/130 |
| 5,269,349 | 12/1993 | Sugier et al. ........... 138/129 X |
| 5,275,209 | 1/1994 | Sugier et al. ........... 138/135 |
| 5,307,842 | 5/1994 | Lequeux ................. 138/149 |
| 5,337,823 | 8/1994 | Nobileau . |

FOREIGN PATENT DOCUMENTS

| | | |
|---|---|---|
| 1546655 | 11/1968 | France . |
| 1497353 | 1/1978 | United Kingdom . |
| WO9200481 | 1/1992 | WIPO . |

*Primary Examiner*—Patrick Brinson
*Attorney, Agent, or Firm*—James E. Bradley

[57] ABSTRACT

A high pressure subsea pipe, particularly for underwater use, has the ability to flex while being transported and installed. The pipe has a friction reinforcement structure made of overlapping layers increasing substantially the capacity of the pipe in longitudinal direction. The reinforcement layer may be a helical wrap, either cylindrical or conical, or conical sleeves nested within one another. An articulated carcass has turns of a helically wrapped main and ancillary wires, offering no axial slack in either tension or compression or in both directions while remaining flexible.

15 Claims, 7 Drawing Sheets

FLEXIBLE HIGH PRESSURE PIPE

BACKGROUND OF THE INVENTION

1. Field of the invention:

This invention relates in general to flexible pipes for conveying fluids at high pressure, and in particular to those used for subsea oil and gas drilling and production.

2. Description of the Prior Art:

In subsea well production and drilling operations, flexible pipes are used for various purposes such as underwater flowlines. A flexible pipe is herein considered to be a pipe having, at least during installation, sufficient flexibility along its longitudinal axis to accept a minimum radius of curvature in the order of five to twenty times the diameter of the pipe, without weakening the structure.

These pipes must resist combined hoop and longitudinal end loads from the high pressure conveyed fluids as well tensile loading during installation and operation. These pipes must also withstand crushing due to external pressures with or without internal pressure inside. Once in place, the internal pressure makes the pipe stiffer, and flexibility is no longer needed. A flexible pipe is easier to transport and install than a rigid pipe.

A typical flexible pipe structure comprises at least one fluid containing tube made of polymer material. A reinforcing armor of metal wires is wound spirally around the fluid containing tube. In some instances, a third structure consisting of a helical winding of interlocking strips is located inside the containing tube. This last structure prevents the fluid containing tube from collapsing under flexible pipe annular pressure and provides radial support to the reinforcing armor while the flexible pipe is under tensile loads without internal pressure. Improvements in strength, manufacturing ease, and cost are desirable.

SUMMARY OF THE INVENTION

In general terms the present invention comprises a flexible pipe for transporting fluids under high pressure within a tubular friction reinforcement structure. In three embodiments shown, part of the friction reinforcement structure comprises helical curved metal strips forming overlapping layers. In a fourth embodiment, the reinforcement layer comprises overlapping conical metal sleeves. The internal fluid pressure causes the overlapping layers to press one against the other. The internal pressure generates friction forces between the overlapping layers sufficient to resist some or all of the loads induced on the flexible pipe by the internal fluid pressure. Preferably, the friction reinforcement layer locates over a fluid containing tube made of an impermeable material, such as a polymer, which provides a corrosion resistant conduit for conveying the high pressure fluids.

Preferably, the overlapping helical strip friction reinforcement structure has transverse slits. In two of the embodiments, the transverse slits provide a curvature to the strip by making the exposed or outer edge a greater length than the enclosed or inner edge when the strip is laid flat. The curvature provides the generally conical configuration for the turns of two of the embodiments of the friction reinforcement structure.

Also, preferably the slits do not extend completely to either edge. A linkage strip provides flexible links and encloses one of the ends of the slit. In one embodiment, links are located on the inner edge of the strip. The slits are laser cut in a widened triangular configuration when the strip is laid flat in a straight line configuration. When wound around the fluid containing tube, the links close or fold over, narrowing the slits to provide the curvature for the strip. In another embodiment, the links are located on the outer edge of the strip, enclosing the ends of the slits adjacent the outer edge. In this instance, the links fold out to widen the slit at the outer edge to provide the greater length for the outer edge. Additionally, to provide a larger manufacturing tolerance, the inner edge of the strip is preferably made into a wavy sinuous shape to decrease the stiffness of the inner edge.

In another embodiment, a plurality of strips are helically wrapped in layers to provide a cylindrical configuration. Each strip does not overlap itself, rather gaps exist between the edges of each strip, providing a cylindrical configuration. The next outer strip overlies the gaps of the next inner strip over which it is wrapped. Slits in the strips give bending flexibility and also create hoop flexibility of the friction reinforcement structure to increase frictional contact between the layers under high internal pressure. The radial outward forces on the friction reinforcement structure are transmitted to the outer carcass.

In another embodiment, the friction reinforcement structure comprises conical sleeves which nest with one another to create the overlapping layers. Helical slits in the conical sleeves assist in flexibility.

An improved interlocked or articulated carcass may extend around the friction reinforcement structure to provide tensile strength when the pipe does not contain high pressure fluid and to provide compressive strength when the pipe is underwater does not contain high pressure fluid. The articulated carcass is preferably made up of circumferentially positioned wires of structural material. The main wire has at least one slot which have a wedge-shaped configuration. At least one ancillary wire of wedge-shaped cross-section is wound into one of the slots for transmitting tensile forces, or alternately for transmitting compressive forces. Also, at least two ancillary wires may be employed for transmitting both compressive and tensile forces.

In some of the embodiments, the main wire has a general S-shape. The main wire has an inward extending flange and an outward extending flange, with the flanges interlocking as the main wire is helically wrapped around the friction reinforcement structure. The flanges and the midsection of the main wire are configured so that opposing surfaces are at diverging angles relative to one another. Two ancillary wires are wrapped around the interlocking members, one located between the inward extending flange and the midsection and the other located between the inward extending flange and the outward extending flange. These ancillary wires are trapezoidal in shape and mate with the diverging tapers of the flanges and midsection. The ancillary wires provide support to resist axial tension or compression, and will accommodate flexibility by sliding on their respective surfaces.

DETAILED DESCRIPTION OF THE EMBODIMENTS

Figure 1:
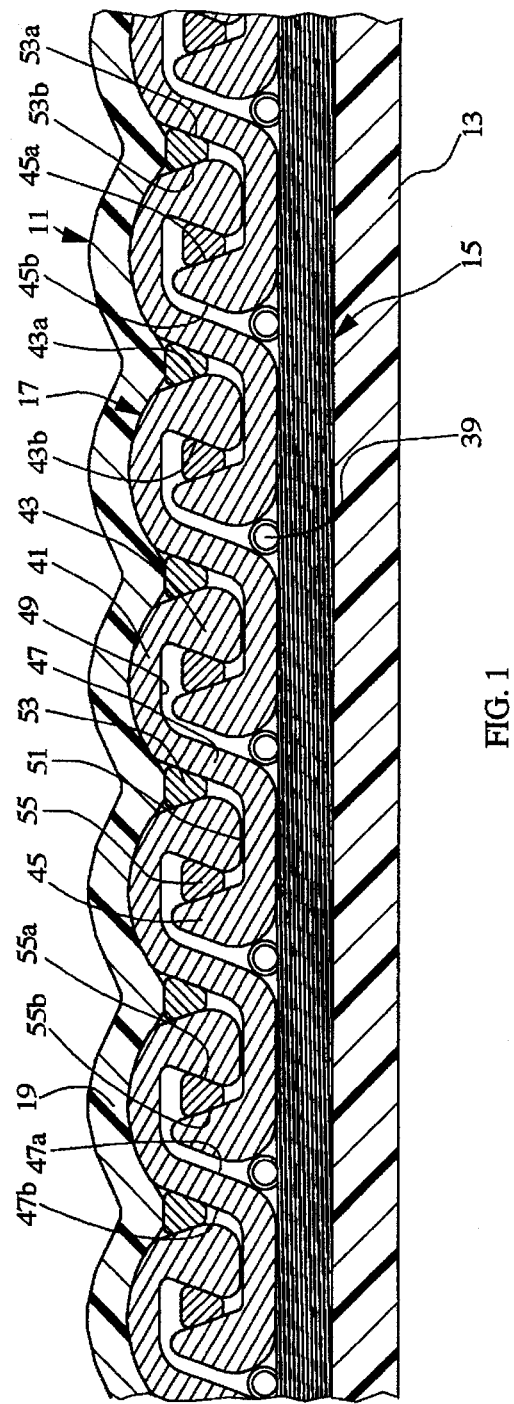
FIG. 1 shows a vertical sectional view of a first embodiment of a flexible pipe constructed in accordance with this invention.

Referring to FIG. 1, pipe 11 is of a type that may be used for subsea high pressure fluid transmission such as oil and gas flowlines. Pipe 11 has a fluid containing tube 13 that is impermeable to contain fluid and preferably made of an extruded polymer material. A friction reinforcement structure 15 encloses fluid containing tube 13 for providing pressure activated high E modulus in axial strength. An articulated carcass 17 is wrapped around friction reinforcement structure 15 for providing low E modulus tensile strength without pressure and high E modulus hoop strength. An outer jacket 19, preferably of an impermeable polymer, is extruded around articulated carcass 17.

Figure 2:
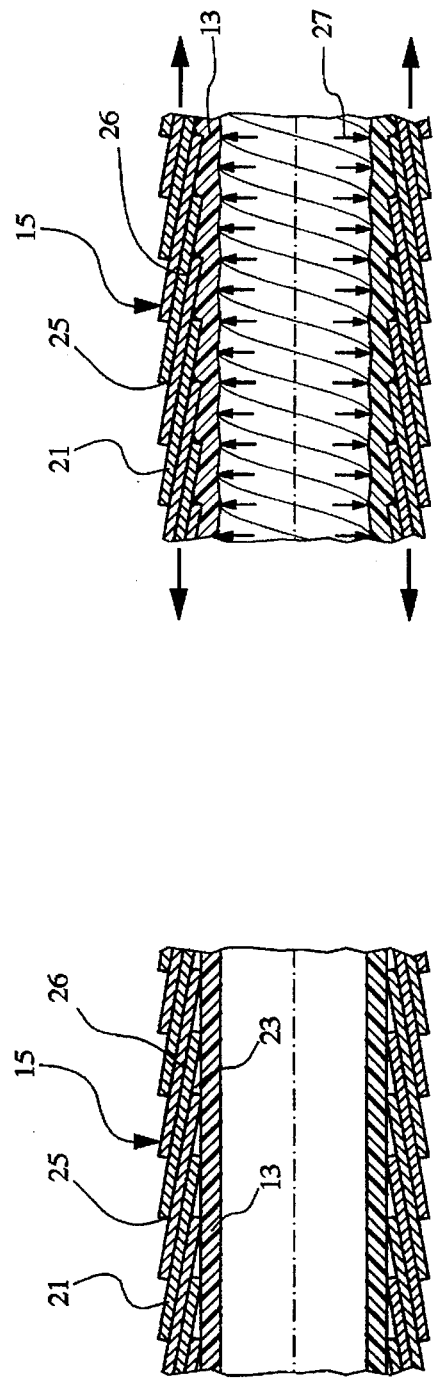
FIG. 2 is a schematic sectional view representing a first embodiment of the friction reinforcement structure of the pipe of FIG. 1, shown prior to being wrapped with an articulated carcass and outer jacket.

Referring to the schematic illustration of FIG. 2, friction reinforcement structure 15 in the first embodiment is made up of a helical wrap of a flat strip 21. Inner edge 23 contacts fluid containing tube 13, while outer or exposed edge 25 overlies the next turn of strip 21. Strip 21 may be of composite material or metal, such as steel. In FIG. 2, for better understanding of the principles, strip 21 is shown having a much narrower width from inner edge 23 to outer edge 25 than actually employed. The width from inner edge 23 to outer edge 25 is preferably such that the radial thickness of the friction reinforcement structure 15 is made of at least five layers of strip 21, which permits the use of a low coefficient of friction between the layers of strip 21. The coefficient of friction between the overlapping turns can range from 0.1 to 0.5, depending upon the nature of the material. The coefficient of friction may be increased by a friction increasing material 26 located between the layers, such as coatings, microgrooving or waving of the contacting surfaces. Furthermore, an elastomer or polymer material sheet may be inserted between the overlapping turns of strip 21 to increase friction. Preferably the width of strip 21 from inner edge 23 to outer edge 25 is at least ten times the radial thickness of friction reinforcement structure 15, which permits stress to be distributed across the width of strip 21.

Figure 3:
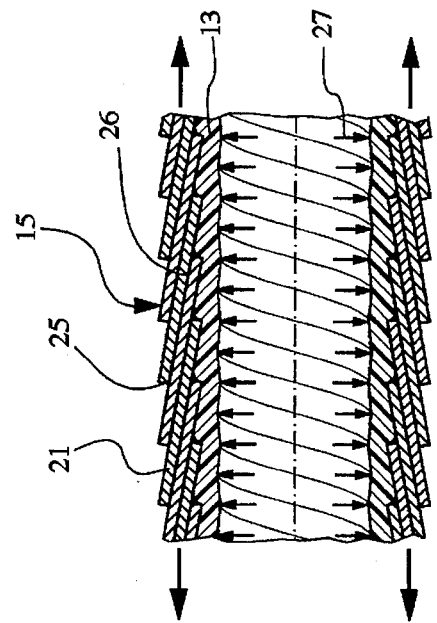
FIG. 3 is a schematic sectional view of the friction reinforcement structure of FIG. 2, but showing the friction effect of internal pressure on the pipe.

When internal pressure is absent, the pipe 15 will flex much more readily than when internal pressure exists, as shown by the arrows 27 of FIG. 3. When flexing, the turns of the strip 21 will move longitudinally slightly relative to each other. The turns 21 are not welded nor mechanically connected to each other. As shown in FIG. 3, each turn of strip 21 resists a substantial portion of the internal pressure in the hoop direction and a substantial portion of the end loads as a result of frictional forces between the turns of strip 21, providing longitudinal resistance. The pressure transmitted through each overlapped portion of each turn of strip 21 becomes less as the number of overlapping turns increase.

Figure 4:
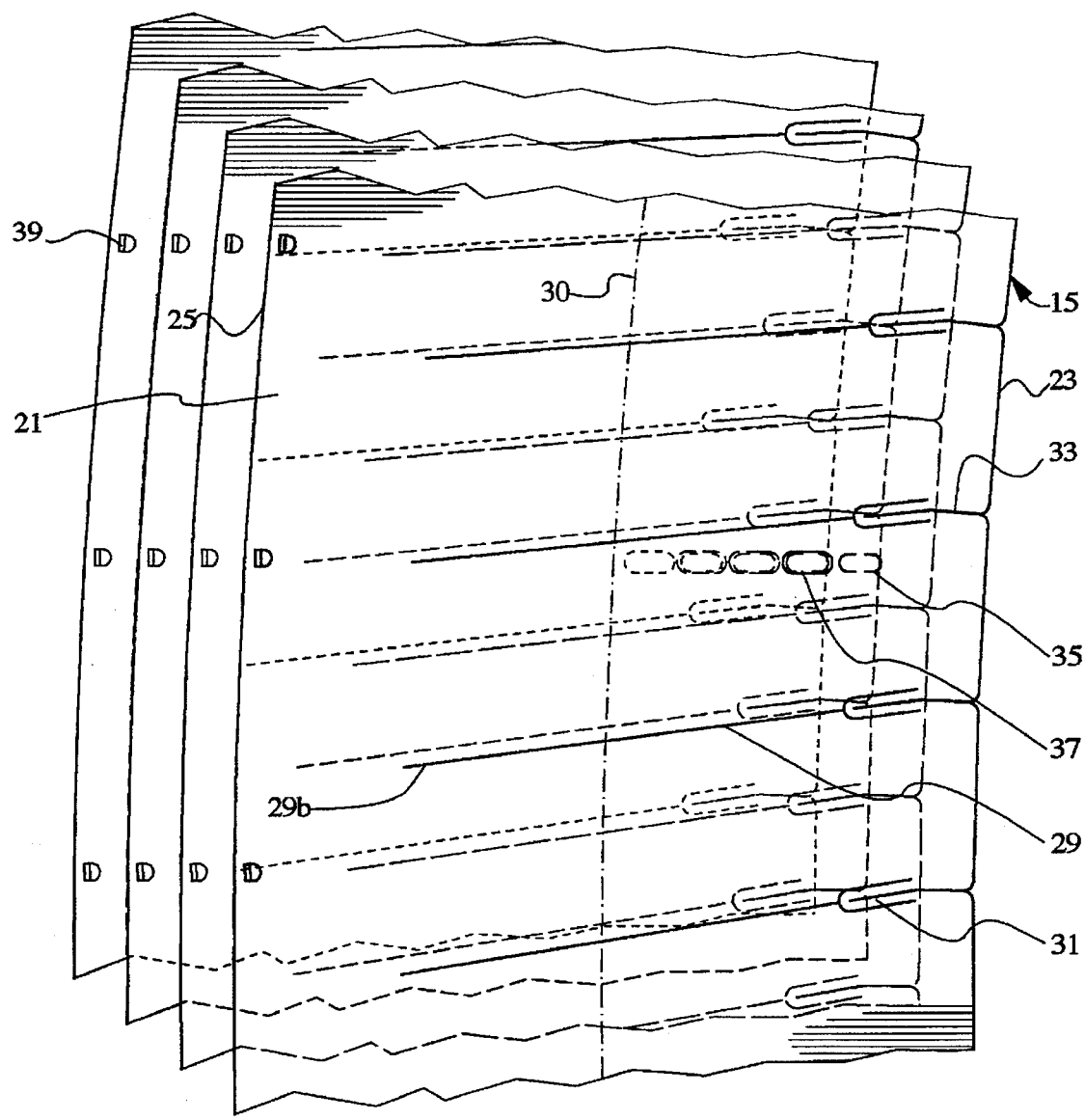
FIG. 4 is a flattened, top view illustrating the friction reinforcement structure of the pipe of FIG. 1, with the articulated carcass and outer jacket removed, and the strip of the friction reinforcement structure laid flat and shown in a curved line configuration.
Figure 5:
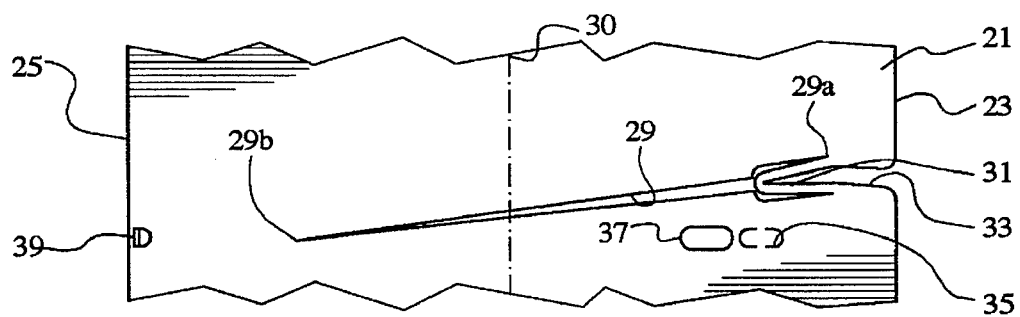
FIG. 5 is a partial top view of the strip of FIG. 4, but shown in a straight line configuration prior to being wrapped in a pipe configuration.

Referring to FIG. 4, in order to conically wrap the strip 21, the inner edge 23 and the outer edge 25 must curve. This is necessary because the outer edge 25 will have a greater length or diameter than the inner edge 23 due to the conical configuration once wrapped. A center line 30 passing through the center of strip 21 when laid flat, as shown in FIG. 4, curves and is parallel to inner and outer edges 23, 25. FIG. 5 shows a portion of strip 21 prior to undergoing curvature, wherein the center line 30 would be straight and the inner and outer edges 23, 25 straight.

To achieve the curved line configuration of FIG. 4, a plurality of parallel slits 29 are formed transversely in strip 21, approximately perpendicular to center line 30. Once strip 21 is wrapped around fluid containing tube 13 (FIG. 1), the slits 29 will be oriented in directions generally parallel to the longitudinal axis of pipe 11. Slits 29 are equally spaced apart from each other at even intervals. The spacing between slits 29 is based on the Modulus of Elasticity of the material of strip 21. In the case of 80 ksi steel, a suitable material, the spacing between slits 29 should not exceed 75 percent of the inner diameter of friction reinforcement structure 15 (FIG. 1). Each slit 29 extends substantially across the width of strip 21, but preferably not completely to either inner edge 23 nor outer edge 25. The inner end 29a of each slit 29 is located adjacent inner edge 23 and the outer end 29b is located about one-fourth of the width of strip 21 from the outer edge 25, in order to not exceed 75 percent of the inner diameter of friction reinforcement structure 15 (FIG. 1), in the case of 80 ksi steel.

A tab or link 31 closes each inner end 29a of each slit 29. Link 31 is a flexible linkage member that is located adjacent, but not directly at the inner edge 23. A link slit 33 extends from link 31 to inner edge 23. Strip 21 is formed by laser cutting slits 29 and 33 to form link 31 while strip 21 is in the straight line flat configuration of FIG. 5. When initially formed, link 31 is in an expanded position shown in FIG. 5. Initially, slit 29 gradually increases in width from its outer end 29b toward its inner end 29a. When wrapping, strip 21 will permanently and plastically deform to the curved line configuration of FIG. 4. The slits 29 close up as links 31 fold. The link slits 33 close up as well. Slits 29 also facilitate flexing of pipe 11 by allowing the edges of each slit 29 to move longitudinally from one another.

Also, preferably strip 21 has a plurality of double lugs 35, each being a closely spaced opposed pair, the pairs being spaced apart along the strip 21. Each pair of lugs 35 is arranged to locate within an elongated aperture 37 of the next turn of strip 21. The double lugs 35 serve as positioning means for positioning the turns of strip 21 over each other. Also, preferably, a plurality of lugs or ears 39 are positioned between slits 29 along strip 21 next to the outer edge 25. Ears 39, as shown in FIG. 1, locate the articulated carcass 17 relative to friction reinforcement structure 15. Ears 39 provide axial indexation between the friction reinforcement structure 15 and the articulated carcass 17.

Referring still to FIG. 1, carcass or articulated carcass 17 serves as tension means for providing tension capability while not transporting fluid under high pressure and in the embodiment shown comprises a main wire 41 wrapped helically around friction reinforcement structure 15 preferably at a helix angle between 70 degrees and 90 degrees relative to the longitudinal axis. Main wire 41 has a general S-shaped formed configuration. Main wire 41 has a radially inward extending flange 43. Inward extending flange 43 is generally trapezoidal in cross-section. It has one surface which is shown in the drawing on the right side, referred to for convenience as first side 43a, that lies at a converging angle in a radial outward direction relative to its opposite or second side 43b. Main wire 41 has an outward extending flange 45 that extends generally radially outward. Outward extending flange 45 is generally triangular in cross-section, having a first side 45a and a second side 45b that lie at angles that converge toward each other in a radial outward direction.

A midsection 47 joins the flanges 43, 45. Midsection 47 has a uniform rectangular cross-section and is inclined relative to a longitudinal axis of pipe 11. Midsection 47 has a first side 47a and a second side 47b which are parallel to each other. In the embodiment shown, first side 47a and second side 47b would intersect the longitudinal axis at about a 70° angle. The outward extending flange second side 45b is parallel to the midsection sides 47a, 47b and to inward extending flange second side 43b. Similarly outward extending flange first side 45a and inwardly extending flange first side 43a are parallel to each other and intersect the longitudinal axis at about a 70° angle.

The configuration of main wire 41 results in an inward facing cavity 49 and an outward facing cavity 51. The inward extending flange 43 locates in the outward facing cavity 51 of the adjacent turn on the first or right side. The outward extending flange 45 locates in the inward facing cavity 49 of the adjacent turn on the second or left side. When pipe 11 is straight, as shown in FIG. 1, clearances exist between inward extending flange 43 and outward extending flange 45 and also between inward extending flange 43 and midsection 47.

To provide solid tensile and compressive engagement without longitudinal gaps between the flanges 43, 45 as mentioned, trapezoidal ancillary wires 53, 55 are wrapped around main wire 41. First ancillary wire 53 is wrapped in a first slot between inward extending flange 43 and midsection 47. First ancillary wire 53 has a first side 53a that is at the same angle as and engages midsection second side 47b. First ancillary wire 53 has a second side 53b that is at the same angle as and engages flange first side 43a. Similarly, an identical second ancillary wire 55 is wound in a second slot between inward extending flange 43 and outward extending flange 45. Second ancillary wire 55 has a first side 55a that contacts and mates with inward extending flange second side 43b. Second ancillary wire 55 has a second side 55b that is at the same angle and mates with outward extending flange first side 47a. Ancillary wire 53 transmits compressive forces between inward extending flange 43 of one turn and midsection 47 of an adjacent turn. Ancillary wire 55 transmits tensile forces between inward extending flange 43 of one turn and outward extending flange 45 of an adjacent turn.

When pipe 11 is flexed, the gaps between the flanges 43, 45 of main wire 41 will change. A side of pipe 11 on the outside bend of the flexion will increase in length while the other side on the inside bend of the flexion will decrease in length. On the increased length side, inward extending flanges 43 and outward extending flanges 45 will move toward each other and contact each other at maximum flexure. When this occurs, the second ancillary wire 55 on the outside bend will slide radially outward a short distance and contact the point of main wire 41 at the root of inward extending flange 43. Correspondingly, on the decreased length side of pipe 11, the flanges 43, 45 would move apart from each other, with inward extending flange 43 contacting midsection 47 at maximum curvature. When this occurs, second ancillary wire 55 on the inner bend slides radially inward and contacts the portion of main wire 41 adjacent the root of outward extending flange 45. Because the portions of second ancillary wire 55 on opposite sides of the bend slide the same radial amount in the same direction, the diameter or perimeter of second ancillary wire 55 does not have to change during the flexing process.

First ancillary wire 53 will slide between inner and outer positions as well during flexing. The portion of first ancillary wire 53 on the outside bend of the pipe will move radially inward, touching the root of midsection 47 at the tip of inward extending flange 53. The portion of first ancillary wire 53 on the inside bend of the pipe will move outward into contact with outer jacket 19. Ancillary wire 53 transmits axial compression forces and ancillary wire 55 transmits axial tensile forces applied to pipe 11.

Figure 6:
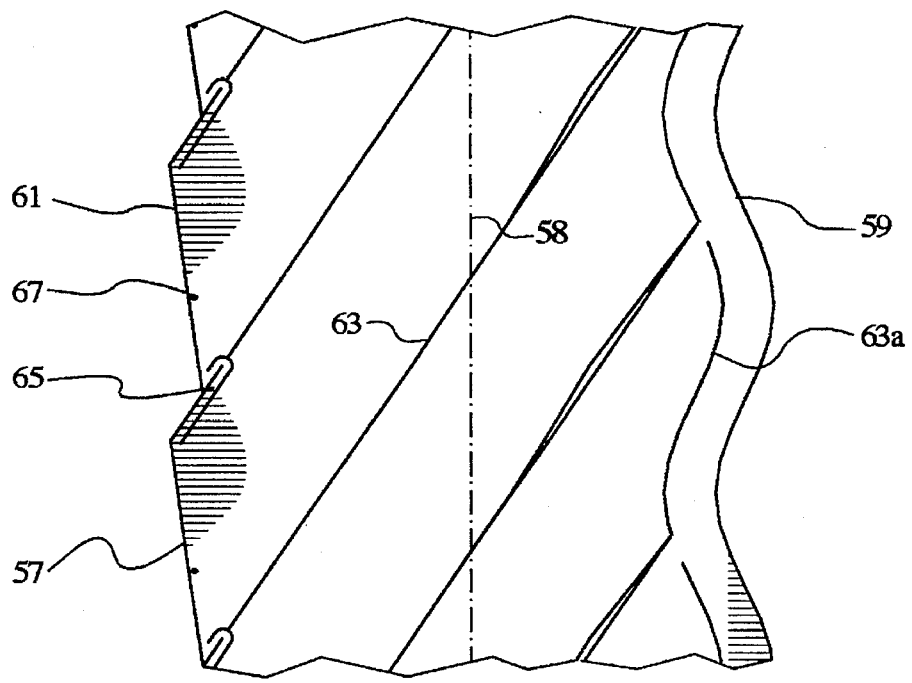
FIG. 6 is a top view of a second embodiment of a strip for the friction reinforcement structure of the pipe of FIG. 1, shown in a straight line configuration.
Figure 7:
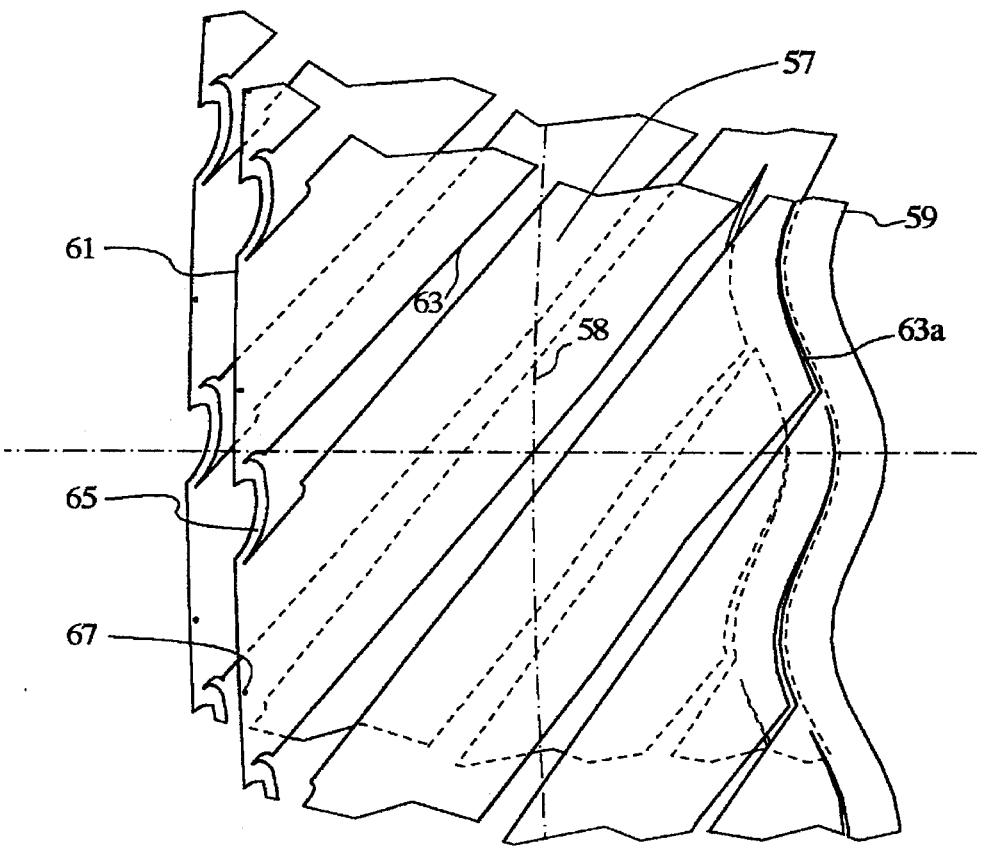
FIG. 7 is a top, flattened view of two of the strips of FIG. 6, shown overlying one another and shown in a curved line configuration.

FIG. 6 and 7 illustrate a first alternate embodiment to the metal strip 21 of FIGS. 4 and 5. Strip 57 is wrapped helically about inner fluid containing tube 13 (FIG. 1) as generally shown in FIGS. 2 and 3 in connection with the first embodiment of a friction reinforcement structure 15. Strip 57 is dimensioned substantially the same as strip 21 of FIG. 4 and may be of the same type of material. Strip 57, once formed into a friction reinforcement structure, will also receive a carcass similar to articulated carcass 17 of FIG. 1 and preferably an outer jacket 19.

Strip 57 is shown in a straight line configuration in FIG. 6, with its center line 58 straight. In FIG. 7, strip 57 has been curved for helical wrapping to the curved line configuration shown by center line 58. Strip 57 has an inner edge 59 and an outer edge 61 which curve when moved to the curved line configuration of FIG. 7. Inner edge 59 is wavy or sinuous, while outer edge 61 is a continuous single arcuate curve when in the curved line configuration. When in the curved line configuration, outer edge 61 will have a greater arcuate length than when in the straight line configuration to provide the conical configuration when wrapped helically.

As in connection with the first embodiment of FIGS. 4 and 5, a plurality of parallel slits 63 are formed in strip 57 to form the curved line configuration. However, slits 63 operate in a reverse manner to the slits 29 of FIGS. 4 and 5. Slits 63 extend transversely across center line 58 at an angle in the embodiment shown that is about 50 degrees relative to center line 58. Once strip 57 is helically wrapped, slits 63 will extend generally at an angle close to 55 degrees relative to the longitudinal axis of the assembled pipe. Each slit 63 has a wavy portion 63a on its inner end that matches the contour of wavy inner edge 59. The curvature of wavy portion 63a follows the contour of inner edge 59 and is spaced a short distance from it. Wavy portion 63a terminates a short distance from reaching the next slit 63. The length of the wavy inner edge 59 from peak to peak may be a greater distance than between slits 63.

Flexible links 65 are located on the outer edges 61. Links 65 close the outer ends of the slits 63. Links 65 move from a collapsed position as shown in FIG. 6 in the straight line configuration to an expanded position as shown in FIG. 7 in the curved line configuration. In the expanded position, outer edge 61 will have a greater overall length than in the straight line position of FIG. 6. Slits 63 expand in width from the inner ends to the outer ends adjacent links 65 when in the curved line configuration. Wavy portion 63a also expands slightly. While in the straight line position of FIG. 6, the portions of outer edge 61 are straight and angled to intersect the center line 58, providing a sawtooth configuration to outer edge 61.

A small hole 67 is shown adjacent outer edge 61 between each slit 63. Hole 67 serves to place a rivet (not shown) which may be employed to rivet to an S-shaped carcass such as articulated carcass 17 of FIG. 1, rather than using ears 39.

Figure 8:
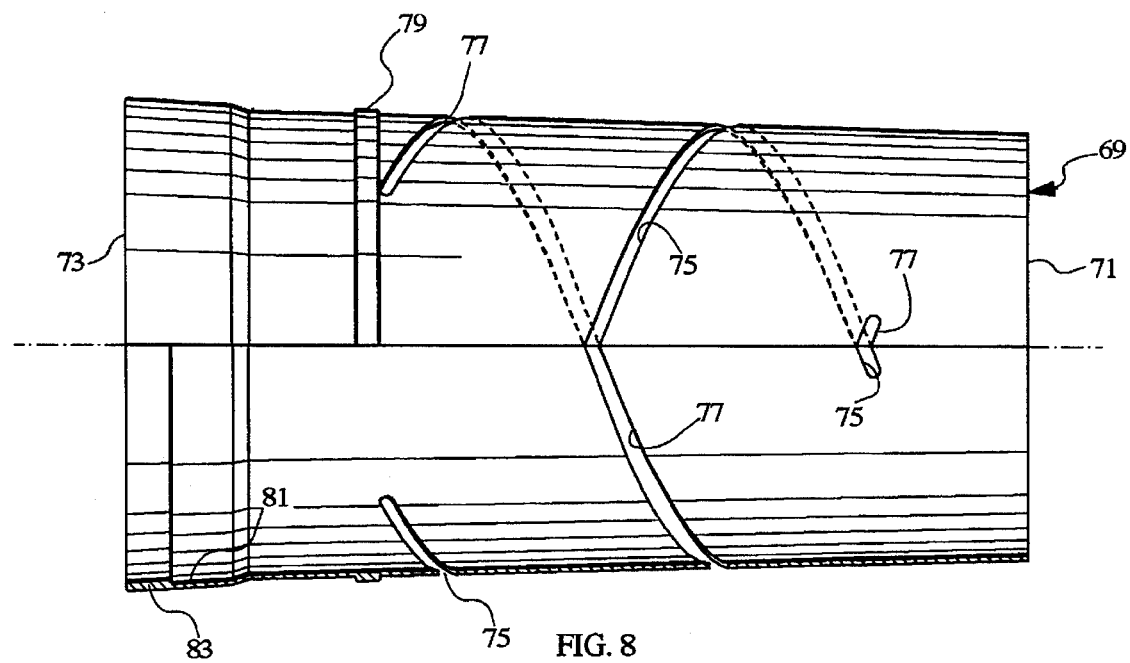
FIG. 8 is a side, partially sectioned view of a conical sleeve for use as a third embodiment for the flexible pipe constructed in accordance with this invention.

FIGS. 8–11 illustrate a third embodiment for a flexible pipe. In this embodiment, a helical wrapped strip is not employed, rather, individual sleeves 69, shown in FIG. 8, are employed. Each sleeve 69 is a continuous conical member with a slight taper from the inner end 71 to the outer end 73. Sleeves 69 will nest within one another to form the friction reinforcement structure. The dimensions, extent of overlap, and material are generally the same as described in connection with strip 21 (FIG. 4) and strip 57 (FIG. 6). Two helical slits 75, 77 are shown formed in the side wall of sleeve 69 to allow flexing of the pipe. Slits 75, 77 are located in a central area and do not reach either of the inner and outer edges 71, 73. The slits 75, 77 are formed opposite each other and do not intersect each other.

Figure 9:
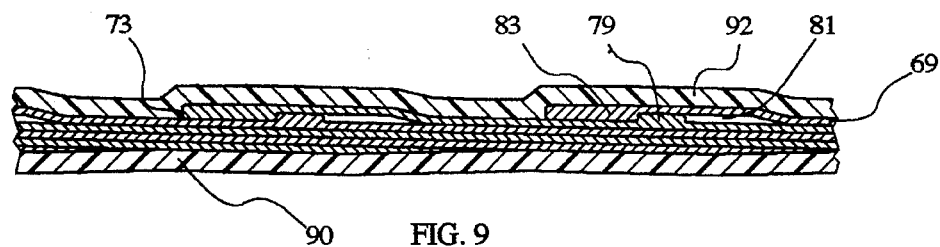
FIG. 9 is an enlarged sectional view of a portion of a pipe having a plurality of the conical sleeves of FIG. 8, interlocked together over a fluid containing tube.
Figure 10:
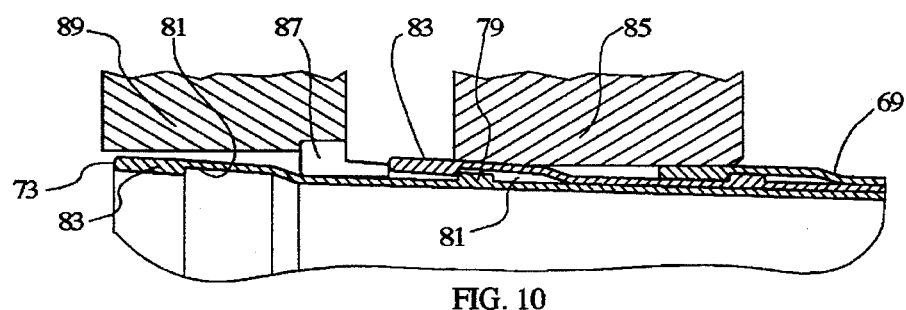
FIG. 10 is a schematic view illustrating the process of crimping two of the conical sleeves of FIG. 8 together, and shown prior to crimping.
Figure 11:
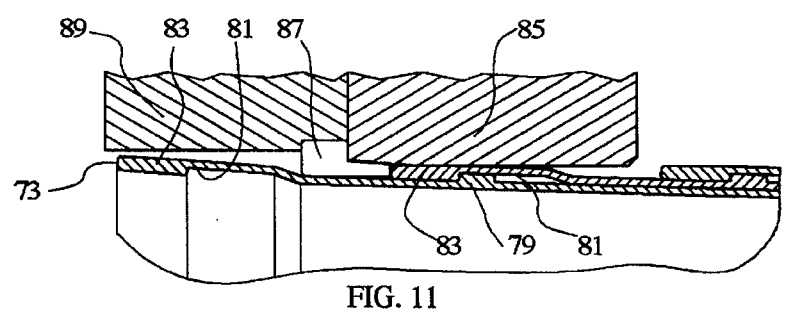
FIG. 11 is a view similar to FIG. 10 but showing the crimping equipment moved to the closed position, interlocking the conical sleeves together.

An external rib 79 is located near the outer end 73. A recess 81 is located internally near the outer end 73, separated from outer end 73 by a rim 83. When nested within each other, rib 79 will locate within the recess 81 of the next sleeve 69, as shown in FIGS. 9-11. As illustrated in FIG. 10, plastic deformation of rim 83 is employed to crimp the sleeves together. This is handled by a block 85 which has an internal conical die that is positioned around sleeve 69 near outer end 73. A split thrust ring 87 housed within a movable block 89 engages the outer end 73 at rim 83. As shown by comparing FIGS. 9 and 10, movable block 89 moves to the right, pushing rim 83 into the conical die of stationary block 85, plastically and permanently deforming rim 83 into locking engagement with rib 79. As shown in FIG. 9, the assembled sleeves 69 may be located over a fluid containing tube 90 of extruded polymer material and enclosed by an outer Jacket 92. A carcass similar to articulated carcass 17 may be mounted over the assembled sleeve 69 or eliminated, as shown, because the interlocked sleeves 69 can transmit tensile force when the pipe does not contain high pressure fluid.

Figure 12:
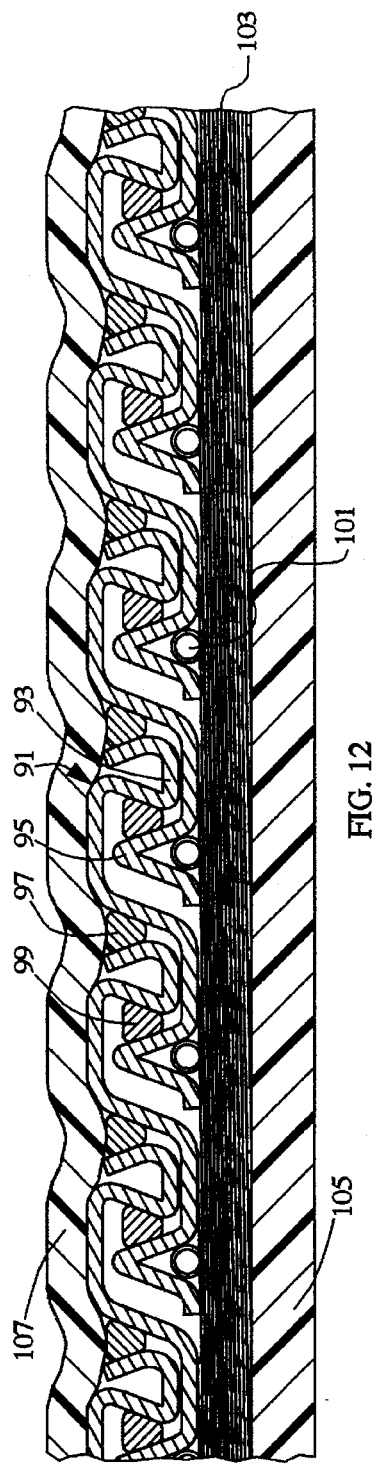
FIG. 12 is a partial sectional view of a second embodiment for an articulated carcass for a pipe constructed in accordance with this invention.

FIG. 12 shows an alternate embodiment to articulated carcass 17 of FIG. 1. In FIG. 12, main wire 91 is similar in function, structure and operation to main wire 41 of FIG. 1. Main wire 91 differs, however, in that it is formed of sheet metal folded into the desired configuration, rather than of solid formed material as in FIG. 1. For some applications, the main wires 91 may be more economical than the main wire 41 of FIG. 1. Main wire 91 has a radially inward extending flange 93 and a radially outward extending flange 95. Inward extending flange 93 and outward extending flange 95 are the same as the flanges 43, 45 (FIG. 1) except that they are not solid members, rather they are bent from metal sheet.

Similarly, trapezoidal ancillary wires 97, 99 are wrapped about the main wire 91. Second ancillary wire 99 locates between inward extending flange 93 and outward extending flange 95. First ancillary wire 97 locates between inward extending flange 93 and the midsection of main wire 91. Ears 101, which protrude from friction reinforcement structure 103, locate in the hollow portion of the outward extending flanges 95. A fluid containing tube 105 is employed of the same type generally as employed with the other embodiments. Similarly, an outer jacket 107 will be preferably located over the articulated carcass formed by main wire 91.

Figure 13:
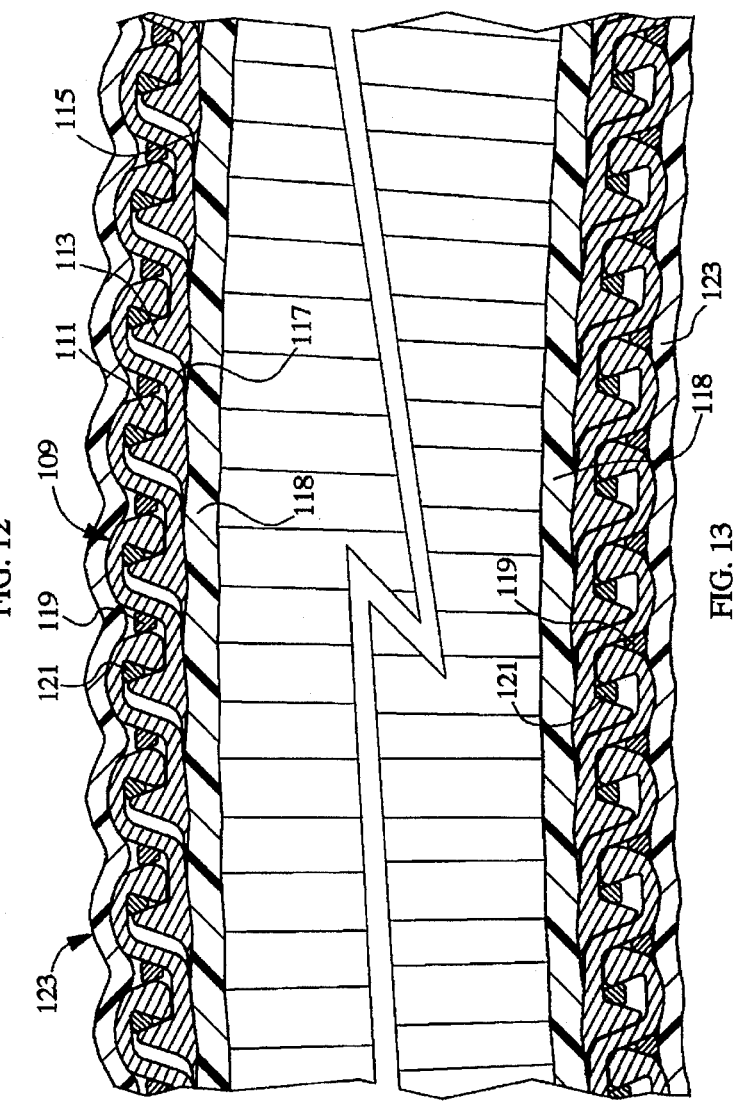
FIG. 13 is a partial sectional view of a third embodiment for an articulated carcass for a pipe constructed in accordance with this invention, and shown without any friction reinforcement structure.

The embodiment shown in FIG. 13 illustrates a third embodiment for an articulated carcass. In this embodiment, no friction reinforcement layer such as friction reinforcement layer 103 (FIG. 12) is utilized. The main wire 109 of the articulated carcass of FIG. 13 is similar to main wire 91 of FIG. 12 and main wire 41 of FIG. 1. Main wire 109 is also of a general S-shape. It has an inward extending flange 111 and an outward extending flange 113. It differs in that it has a seal section 115 that extends axially outward from radially outward extending flange 113 of formed main wire 109. Seal section 115 extends in the second direction with its inner surface in contact with fluid containing tube 118. Seal section 115 locates under the adjacent turn in the second direction, under main wire midsection 117. The upper surface of seal section 115 sealingly engages the adjacent midsection 117, resulting in a metal-to-metal sealing contact.

In the same manner as in the embodiments of FIGS. 1 and 12, ancillary wires 119, 121 are employed. Second ancillary wire 121 is also trapezoidal in configuration and located between the inward extending flange 111 and the outward extending flange 113. First ancillary wire 119 is trapezoidal and locates between the midsection 117 and the inward extending flange 111. Outer jacket 123 is preferably located over the articulated carcass formed by main wire 109. FIG. 13 shows a flexed configuration. In the outside portion of the bend, which is shown as the upper portion, inward extending flange 111 contacts outward extending flange 113. This pushes second ancillary wire 121 radially outward into contact with main wire 109 adjacent the root of inward extending flange 111. Directly opposite, at the inside portion of the bend, inward extending flange 111 has moved into contact with midsection 117. This opens the space for second ancillary wire 121 to move radially inward into contact with main wire 109 at the root of outward extending flange 113. The diameters of the ancillary wires 119, 121 are the same and do not change while undergoing flexing. When moved to the straight configuration, the ancillary wires 119, 121 would relocate, as well as the inward extending and outward extending flanges 111, 113 as shown in FIG. 12.

Figure 14:
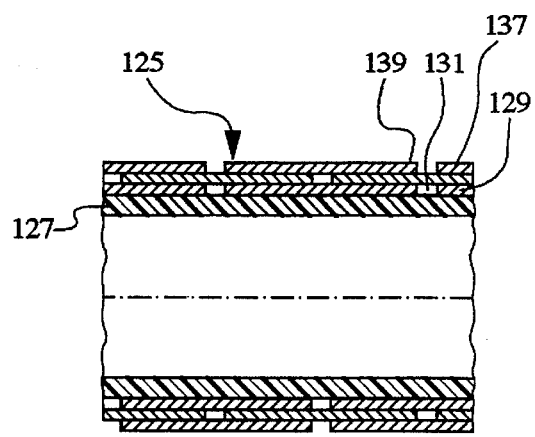
FIG. 14 is a partial sectional view illustrating a fourth embodiment for a friction reinforcement structure, with the articulated carcass not being shown.
Figure 15:
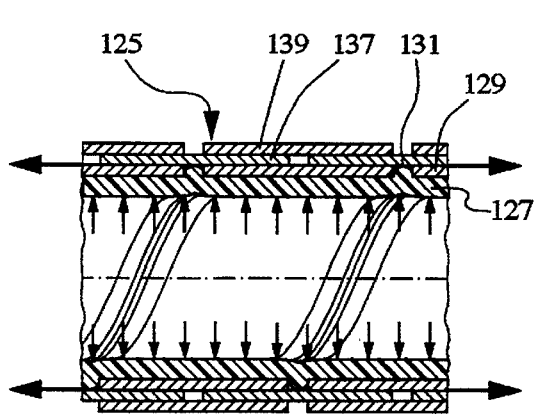
FIG. 15 is a partial sectional view of the friction reinforcement structure of FIG. 14, but showing internal pressure inside the pipe.
Figure 16:
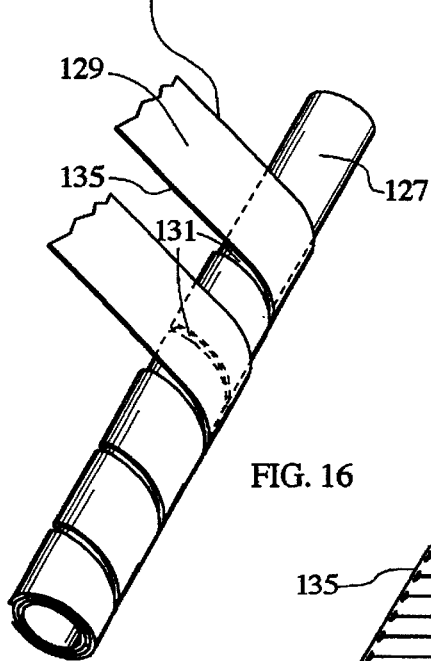
FIG. 16 is a simplified, schematic view illustrating an inner strip being wrapped around a fluid containing tube for beginning construction of the friction reinforcement structure of FIG. 14.

FIGS. 14-17 show a fourth embodiment for a friction reinforcement structure 125 which may be used in place of the friction reinforcement structure 15 of FIG. 1. In this embodiment, a flat inner strip 129 is wrapped helically around an elastomeric fluid containing tube 127. As illustrated in FIG. 16, the spiral formed by the inner strip 129 has a different angle relative to the longitudinal axis of fluid containing tube 127 than strip 21 of FIG. 2, so that the turns of strip 129 do not overlap each other. Rather a uniform small gap 131 will be present between its first and second edges 133, 135. This results in a cylindrical configuration to the strip 129 when view in cross-section, rather than a conical configuration as in FIG. 2. The diameter of inner strip 129 is uniform and the same at its first and second edges 133, 135.

Referring to FIGS. 14 and 15, an intermediate strip 137, identical to inner strip 129, is wrapped helically over inner strip 129 in the same cylindrical configuration. Intermediate strip 137 does not contact fluid containing tube 127. Intermediate strip 137 has similar gaps between its edges to gap 131 and is centered over gap 131. Similarly, an outer strip 139, identical to inner strip 129, may be wrapped helically over intermediate strip 127 in the same manner. Outer strip 139 has gaps between its first and second edges, and outer strip 139 is centered over the gaps between the edges of intermediate strip 137. More than one intermediate strip 137 could be employed if needed, resulting in more than three layers. The widths of the strips 129, 137, 139 are the same and are selected so that the amount of overlapped portion on inner strip 129 by intermediate strip 137 is at least equal to 25 percent of the width of inner strip 129. Similarly, the amount of overlapped portion on intermediate strip 137 by outer strip 139 is at least equal to 25 percent of the width of inner strip 129.

Figure 17:
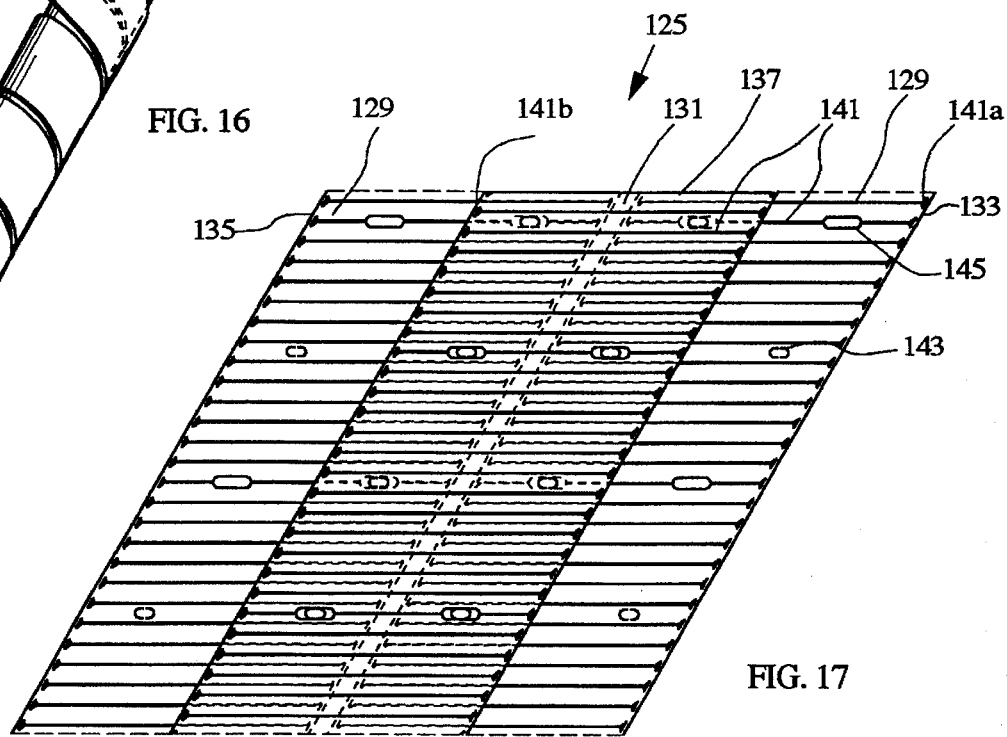
FIG. 17 is a flattened top view illustrating schematically an inner and intermediate strip overlying one another for the friction reinforcement structure of FIG. 14.

In the embodiment shown, strips 129, 137, and 139 are of metal. FIG. 17 shows inner strip 129 and intermediate strip 137 overlapped and flattened. Each of the strips 129, 137, and 139 contains a plurality of evenly spaced transverse slits 141. Each slit 141 is approximately perpendicular to the center line of each strip 129, 137, 139. Each slit 141 extends substantially across the strip, having a first end 141a spaced near the first edge 133 and a second end 141b spaced near the second edge 135.

Also, each of the strips 129, 137, and 139 has positional means comprising a pairs of lugs 143 spaced along its length and alternated with elongated apertures 145. Apertures 145 are elongated more than the dimension of the lug-pairs 143 to allow slight longitudinal movement of lug-pairs 143 within apertures 145. When wrapped, lugs 143 of inner strip 129 locate within the apertures 145 of intermediate strip 137 to position the strips 129, 137 together. Lugs 143 of intermediate strip 137 locate within apertures 145 of outer strip 139 to position strips 137, 139 together. A carcass (not shown) similar to articulated carcass 17 of FIG. 1 would be wrapped over the friction reinforcement structure 125. Engagement means (not shown) such as rivets or the like may be employed to link the carcass to friction reinforcement structure 125.

As illustrated in FIG. 15, internal pressure acts against the strips 129, 137, 139 to force them radially outward in tight frictional engagement with each other. The slits 141 (FIG. 17) reduce hoop stress and allow slight radial expansion of each of the strips 129, 131, 139 to increase the frictional contact. Hoop strength is provided by the articulated carcass (not shown) surrounding friction reinforcement structure 125. The frictional engagement resists the longitudinal or axial forces applied on the pipe by the internal pressure. The fluid containing tube 127 cannot extrude into the gaps 131, since the gaps 131 are very small and closed by internal pressure. Also, the lugs 143 and apertures 145 allow the strips 129, 137, 139 to move slightly relative to each other in longitudinal directions when not under high internal pressure to allow flexing during transportation and installation.

Figure 18:
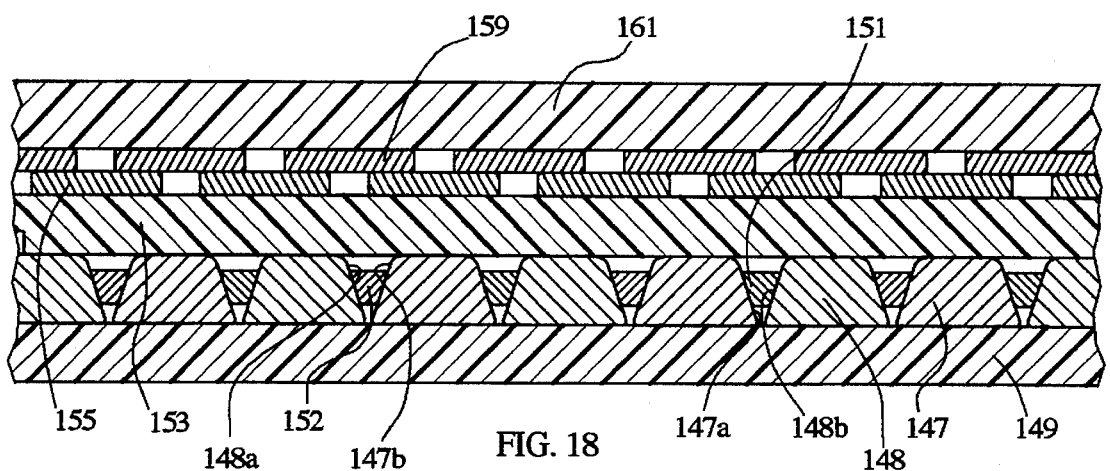
FIG. 18 is a partial sectional view of a pipe constructed in accordance with this invention, illustrating a fourth embodiment for a compression articulated carcass.

Referring to FIG. 18, a pipe illustrating a fourth type of articulated carcass is shown. This embodiment uses two main wires 147, 148 helically wrapped around a fluid containing tube 149. The turns of the main wires 147, 148 are parallel and adjacent to each other, preferably at a helix angle between 70 degrees and 90 degrees relative to the longitudinal axis, and interwound with one another. Main wires 147, 148 are generally trapezoidal in configuration, having faces 147a, 148a on the right side and faces 147b, 148b on the left side. Faces 147a and 147b are at an acute angle relative each other, diverging in a radial outward direction. Also, faces 148a and 148b are at an acute angle relative each other, diverging in a radial outward direction. This results in generally wedge shaped slots between the faces 147a, 148b and 147b, 148a of adjacent turns of main wires 147, 148.

Ancillary wires 151, 152 are wound into the slots defined by the opposing faces 147a, 148b and 147b, 148a. Ancillary wires 151, 152 are trapezoidal in configuration, having mating faces. Ancillary wires 151, 152 act in the same manner as the ancillary wires previously described in connection with the first three embodiments. Ancillary wires 151, 152 are used for transmitting compression forces only and will not transmit tensile forces between the segments or turns of main wires 147 and 148. The tension is taken by two layers of wires 155, 159 wound helically at an angle smaller than 55 degrees relative to the longitudinal axis. A polymer impermeable layer 153 is inserted between main wires 147, 148 and tension layer wires 155, 159 in this embodiment. An outer jacket 161 of an impermeable polymer material surrounds the outer layer 159.

Figure 19:
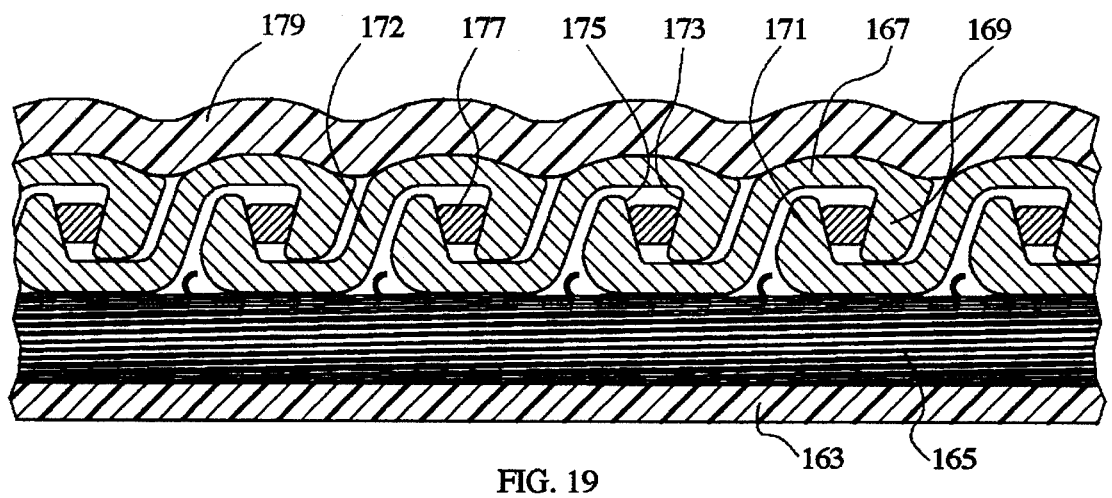
FIG. 19 is a partial sectional view of a pipe constructed in accordance with this invention, illustrating a fifth embodiment for a tension articulated carcass.

FIG. 19 is a partial sectional view of a pipe illustrating a fifth embodiment for an articulated carcass. In this embodiment, fluid containing tube 163 receives a friction reinforcement layer 165 that may be of a type as previously described in connection with the other embodiments. Main wire 167 is of a general S- shaped configuration and is wrapped helically around friction reinforcement layer 165 at a helix angle between 70 degrees and 90 degrees relative to the longitudinal axis. Main wire 167 includes an inward extending flange 169 that interlocks with an outward extending flange 171 of an adjacent turn. Flanges 169 and 171 are joined together by an inclined midsection 172. The inward extending flange 169 has a face 173 that opposes a face 175 on the outward extending flange of an adjacent turn. Faces 173, 175 are at an acute angle relative to each other, diverging radially outward. This results in a wedge shaped configuration.

A generally trapezoidal ancillary wire 177 locates within the slot defined by the opposed faces 173, 175. Ancillary wire 177 acts in the same manner as the ancillary wires previously described. Ancillary wire 177 is used for transmitting tensile forces only along main wire 167, not compression forces as in the embodiment of FIG. 18. The gap shown between the inward extending flange 169 and the midsection 172 in this embodiment does not receive an ancillary wire. For some applications, there is no need to use an ancillary wire for transmitting compressive forces between turns of main wire 167. An outer jacket 179 of elastomeric material surrounds main wire 167.

Figure 20:
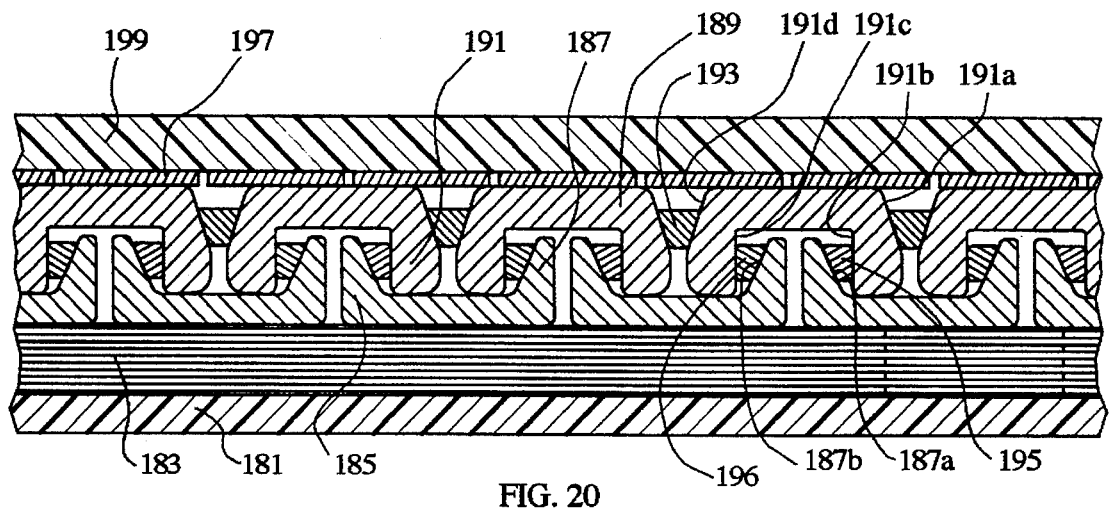
FIG. 20 is a partial sectional view of a pipe constructed in accordance with this invention, illustrating a sixth embodiment for a tension and compression articulated carcass.

FIG. 20 illustrates a pipe having a sixth embodiment of an articulated carcass constructed in accordance with this invention. Fluid containing tube 181 receives a friction reinforcement layer 183 that may be of the same type as previously described in connection with the other embodiments. The tensile means, in this instance, comprises an inner main wire 185 that is of a general U-shaped configuration. Inner main wire 185 is preferably helically wrapped at a helix angle between 70 degrees and 90 degrees relative to the longitudinal axis with gaps between its turns. Inner main wire 185 has two outward facing flanges 187, one on each edge. An outer main wire 189 is wrapped over inner main wire 185 at the same helix angle relative to the longitudinal axis. Outer main wire 189 has also a general U-shape, with inward facing flanges 191. Flanges 191 interlock with flanges 187.

Outward facing flanges 187 have two inclined faces 187a, 187b. Inward facing flanges 191 have four faces 191a, 191b, 191c, and 191d. The face 191a of adjacent turns oppose the face 191b and define a wedge shaped slot which diverges outward. An ancillary wire 193 locates within the slot between the faces 191a, 191d of adjacent turns and takes the axial compression load.

The face 191b opposes the face 187a of an adjacent turn, and the face 191c opposes the face 187b, also resulting in a wedge shaped slot. However, faces 191b, 191c in the embodiment shown, are in planes perpendicular to the longitudinal axis of the pipe, while faces 187a, 187b are located at different angles. The slots defined by faces 187a, 191b and 187b, 191c diverge in an outward direction. Two ancillary wires 195, 196 having mating shapes wedge within the slots defined the faces 191b, 187a and 191c, 187b. Ancillary wires 193, 195, and 196 operate in the same manner as the ancillary wires described in connection with the other embodiments. Ancillary wire 193 transmits compression forces on the pipe while ancillary wires 195, 196 transmit tensile forces on the pipe.

An additional reinforcement layer 197 surrounds outer main wire 189. In the embodiment shown, reinforcement layer 183 comprises a flat strips helically wrapped in a cylindrical configuration. An outer jacket 199 that is impermeable encloses friction reinforcement layer 197.

The invention has significant advantages. The pipe is flexible for easy transportation and installation, yet will withstand high pressures. The use of the slits provides adequate flexibility and allows helical wrappings to be employed in a conical overlapping configuration without needing to deform substantially the main wires or strips plastically to create curvature. The slits within the conical sleeves allow flexing. The slits also allow radial expansion of the layers to enhance frictional engagement. The layers withstand high pressure due to the large frictional contact surfaces, resisting most of the longitudinal tension as well as some of the hoop load. The articulated carcass provides hoop strength as well as flexibility and installation tensile strength while the ancillary wires avoid longitudinal slack in the articulated carcass during flexing.

While the invention has been shown in several of its forms, it should be apparent to those skilled in the art that it is not so limited, but is susceptible to various changes without departing from the scope of the invention. For example, although all of the embodiments describe metal as the material of the slits, composite nonmetallic fiber strips could also be employed for some applications. In that event, unidirectional parallel fibers could be orientated in a desired direction for strength, and the slits in the strips could be eliminated. Also, the main wires for the articulated carcass could comprise stacked rings rather than turns of a helical wrap or interwound multiple main wires. The slots for the trapezoidal ancillary wires in some of the embodiments could converge radially outward rather than diverge.

I claim:

1. A pipe for transporting fluid under high pressure, comprising in combination:

a reinforcement structure formed of overlapping layers of circumferentially extending structural material and having a longitudinal axis;

tension means for providing tension capability to the pipe while not transporting fluid under high pressure;

positioning means for positioning the overlapping layers in a selected position relative to each other and for connecting the reinforcement structure to the tension means for longitudinal movement therewith; and wherein the positioning means of the overlapping layers allows limited longitudinal movement of the overlapping layers relative to each other while not transporting fluid under high pressure to accommodate flexing of the pipe during installation of the pipe; and the fluid pressure caused by transporting fluid under high pressure causes the overlapping layers to press one against the other, generating friction forces between the overlapping layers to resist at least some of the loads induced on the pipe by the fluid pressure.

2. The pipe according to claim 1, wherein:

the positioning means comprises means for connecting the overlapping layers of the reinforcement structure to each other for transmitting tension between the overlapping layers.

3. A pipe for transporting fluid under high pressure, comprising in combination:

a reinforcement structure formed of overlapping layers of circumferentially extending structural material and having a longitudinal axis;

tension means for providing tension capability to the pipe while not transporting fluid under high pressure;

positioning means for positioning the overlapping layers in a selected position relative to each other for connecting the reinforcement structure to the tension means for longitudinal movement therewith; wherein the positioning means of the overlapping layers allows limited longitudinal movement of the overlapping layers relative to each other while not transporting fluid under high pressure to accommodate flexing of the pipe during installation of the pipe;

the fluid pressure while transporting fluid under high pressure causes the overlapping layers to press one against the other, generating friction forces between the overlapping layers to resist at least some of the loads induced on the pipe by the fluid pressure; and wherein the tension means comprises at least one wire wound helically around the pipe coaxial to the reinforcement structure.

4. A pipe for transporting fluid under high pressure, comprising in combination:

a reinforcement structure formed of overlapping layers of circumferentially extending structural material and having a longitudinal axis;

tension means for providing tension capability to the pipe while not transporting fluid under high pressure;

positioning means for positioning the overlapping layers in a selected position relative to each other for connecting the reinforcement structure to the tension means for longitudinal movement therewith; wherein the positioning means of the overlapping layers allows limited longitudinal movement of the overlapping layers relative to each other while not transporting fluid under high pressure to accommodate flexing of the pipe during installation of the pipe;

the fluid pressure caused by transporting fluid under high pressure causes the overlapping layers to press one against the other, generating friction forces between the overlapping layers to resist at least some of the loads induced on the pipe by the fluid pressure; and wherein the positioning means comprises a protuberance protruding from a surface of one layer and a recess located within an adjacent one of the layers for receiving the protuberance.

5. A pipe for transporting fluid under high pressure, comprising in combination:

a reinforcement structure formed of overlapping layers of circumferentially extending structural material and having a longitudinal axis;

tension means for providing tension capability to the pipe while not transporting fluid under high pressure;

positioning means for positioning the overlapping layers in a selected position relative to each other for connecting the reinforcement structure to the tension means for longitudinal movement therewith; wherein the positioning means of the overlapping layers allows limited longitudinal movement of the overlapping layers relative to each other while not transporting fluid under high pressure to accommodate flexing of the pipe during installation of the pipe;

the fluid pressure caused by transporting fluid under high pressure causes the overlapping layers to press one against the other, generating friction forces between the overlapping layers to resist at least some of the loads induced on the pipe by the fluid pressure; and a plurality of slits formed in each of the overlapping layers to facilitate flexing of the pipe; and wherein the overlapping layers comprise a helically wrapped flat strip of metal.

6. The pipe according to claim 5, wherein the overlapping layers have a friction increasing material located between the layers.

7. The pipe according to claim 5, wherein the slits extend transversely across the strip, each of the slits having an end adjacent an edge of the strip.

8. The pipe according to claim 7, wherein the overlapping layers, when pressed one against the other by the fluid pressure, provide metal-to-metal sealing contact with each other.

9. The pipe according to claim 7 wherein:

one of the ends of each of the slits is closed by a linkage section which is deformable to change the widths of the slits adjacent to one of the edges of the strip to produce a curved line configuration for the strip to permit helical overlapping wrapping.

10. A pipe for transporting fluid under high pressure, comprising in combination:

a reinforcement structure formed of overlapping layers of circumferentially extending structural material and having a longitudinal axis;

tension means for providing tension capability to the pipe while not transporting fluid under high pressure;

positioning means for positioning the overlapping layers in a selected position relative to each other; wherein the positioning means of the overlapping layers allows limited longitudinal movement of the overlapping layers relative to each other while not transporting fluid under high pressure to accommodate flexing of the pipe during installation of the pipe;

the fluid pressure caused by transporting fluid under high pressure causes the overlapping layers to press one against the other, generating friction forces between the overlapping layers to resist at least some of the loads induced on the pipe by the fluid pressure; and wherein the tension means and the positioning means comprise:

a protruding rib formed on an outer wall of each of the overlapping layers; and a shoulder located on an inner wall of each of the overlapping layers which engages the rib of an adjacent one of the overlapping layers.

11. The pipe according to claim 1, wherein the overlapping layers comprise:

at least one helically flat strip wrapped in turns in a conical configuration, each of the turns overlapping an adjacent turn by an amount that is greater than 50 percent of the width of the strip.

12. The pipe according to claim 1, wherein:

the reinforcement structure has a radial thickness measured relative to the longitudinal axis; and the axial width of each of the overlapping layers is at least ten times the radial thickness of the reinforcement structure.

13. A pipe for transporting fluid under high pressure, comprising in combination:

a reinforcement structure having a longitudinal axis and formed of overlapping layers made of at least one helically wrapped flat strip in a conical configuration, each of the overlapping layers overlapping an adjacent layer by an amount that is greater than 50 percent of an axial width of the strip;

tension means for providing tension capability to the pipe while not transporting fluid under high pressure; and wherein the overlapping layers are free for limited longitudinal movement relative to each other while not transporting fluid under high pressure to accommodate flexing of the pipe during installation of the pipe; and the fluid pressure while transporting fluid under high pressure causes the overlapping layers to press one against the other, generating friction forces between the overlapping layers to resist at least some of the loads induced on the pipe by the fluid pressure.

14. A pipe for transporting fluid under high pressure, comprising in combination:

a reinforcement structure having a longitudinal axis and formed of overlapping layers made of at least one helically wrapped flat strip in a conical configuration, each of the overlapping layers overlapping an adjacent layer by an amount that is greater than 50 percent of an axial width of the strip;

tension means for providing tension capability to the pipe while not transporting fluid under high pressure; wherein the overlapping layers are free for limited longitudinal movement relative to each other while not transporting fluid under high pressure to accommodate flexing of the pipe during installation of the pipe;

the fluid pressure caused by transporting fluid under high pressure causes the overlapping layers to press one against the other, generating friction forces between the overlapping layers to resist at least some of the loads induced on the pipe by the fluid pressure; and wherein:

the strip is of metal having inner and outer edges and a plurality of slits extending transversely across the strip;

the inner ends of the slits are closed and spaced from the inner edge of the strip; and a flexible linkage section extends across and closes the outer end of each of the slits, the flexible linkage section being foldable from a retracted dimension when the strip is in a straight line configuration to an extended dimension for conical overlapping of the layers, thereby increasing the width of each of the slits from the inner end to the outer end to give to the strip a curved line configuration.

15. A pipe for transporting fluid under high pressure, comprising in combination:

a reinforcement structure having a longitudinal axis and formed of overlapping layers made of at least one helically wrapped flat strip in a conical configuration, each of the overlapping layers overlapping an adjacent layer by an amount that is greater than 50 percent of an axial width of the strip;

tension means for providing tension capability to the pipe while not transporting fluid under high pressure; wherein the overlapping layers are free for limited longitudinal movement relative to each other while not transporting fluid under high pressure to accommodate flexing of the pipe during installation of the pipe;

the fluid pressure caused by transporting fluid under high pressure causes the overlapping layers to press one against the other, generating friction forces between the overlapping layers to resist at least some of the loads induced on the pipe by the fluid pressure; and wherein:

the strip is of metal having inner and outer edges and a plurality of slits extending transversely across the strip;

the outer ends of the slits are closed and spaced from the outer edge of the strip; and a flexible linkage section extends across and closes the inner end of each of the slits, the flexible linkage section being foldable from an extended dimension when the strip is in a straight line configuration to a retracted dimension for conical wrapping of the overlapping layers, the slits having an increasing width from the outer end to the inner end when the strip is in the straight line configuration, the linkage section decreasing the width of each of the slits when moved to the retracted position to give to the strip a curved line configuration.

* * * * *